July 5, 1949.  E. A. WINFIELD  2,474,878
ENGINE BLOCK AND CYLINDER ASSEMBLY
Filed Aug. 17, 1945  2 Sheets-Sheet 1
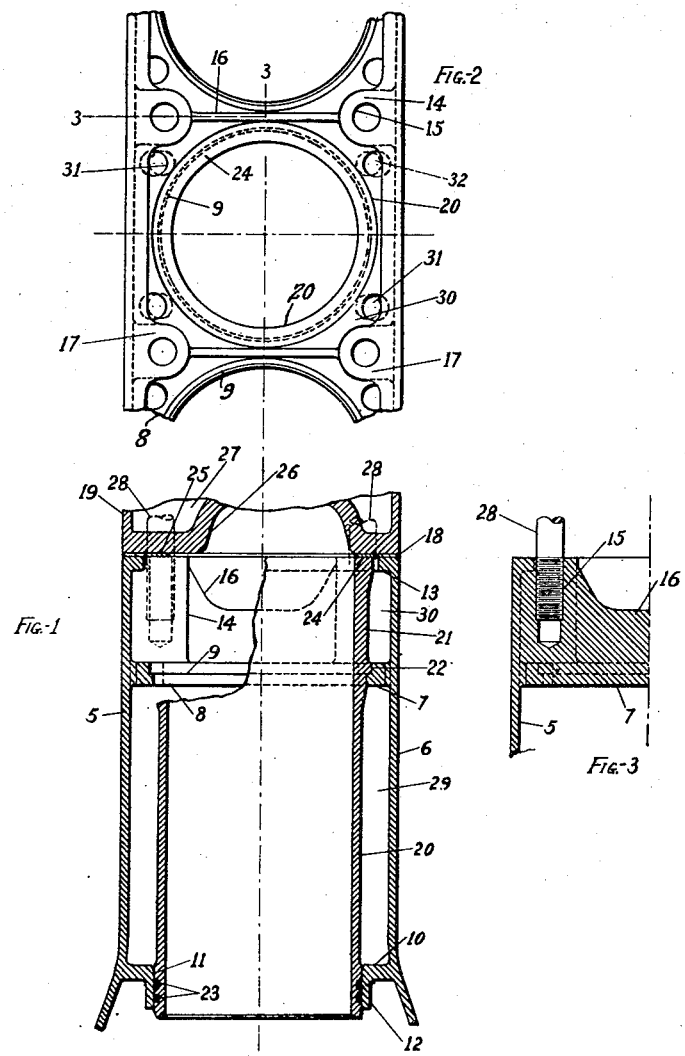
INVENTOR.
Edward A. Winfield
BY
Strauch & Hoffman
Attys.

July 5, 1949.  E. A. WINFIELD  2,474,878
ENGINE BLOCK AND CYLINDER ASSEMBLY
Filed Aug. 17, 1945  2 Sheets-Sheet 2

INVENTOR.
Edward A. Winfield
BY
Strauch & Hoffman
Attys.

Patented July 5, 1949

2,474,878

UNITED STATES PATENT OFFICE 2,474,878

ENGINE BLOCK AND CYLINDER ASSEMBLY

Edward A. Winfield, Los Angeles, Calif.

Application August 17, 1945, Serial No. 610,938

5 Claims. (Cl. 123—173)

1

My present invention relates to improvements in internal combustion engines. More particularly, my invention relates to improvements in the engine block and piston cylinder assembly suitable for use in Diesel and spark ignition type engines.

The high temperatures of combustion in internal combustion engines makes the lubrication of the upper part of the cylinder rather difficult even under ideal conditions. This is particularly true in Diesel engines because of the extreme temperatures of operation at high compression. Cooling of the cylinder should therefore be effective throughout its length for the best operating conditions. However the usual internal combustion engine blocks have about one-half to three-quarters of an inch of solid metal around the compression ends of the cylinders not reached by cooling water which tend to heat excessively, destroying the lubrication for the piston and causing distortion of the cylinder which results in leakage around the piston and in power loss and excessive wear. In efforts to minimize these disadvantages, the piston rings have been moved inward from the ends of the pistons to avoid contact with the excessively heated cylinder sections. This, however, results in poor bearing support of the pistons in the cylinders, and in two stroke engines, where the piston controls the exhaust and intake of gases and air, it introduces errors and leakages in the valving operation which result in losses of efficiency and power.

A further disadvantage of prior blocks is that their constructions are such as to introduce deflections and distortions due to tightening of the head bolts which are transmitted to the compression ends of the cylinders, resulting in losses of power and efficiency, in undue wear, and in the necessity of using relatively soft head gaskets. Even with soft gaskets improper head gasket seating occurs with resultant tendencies to blow out the gaskets.

A primary object of the present invention therefore is to provide an improved cylinder block construction for internal combustion engines in which the cylinders are water cooled to their high compression ends, thereby minimizing heat distortions, providing maximum effectiveness of lubrication in the high compression zone, and permitting location of sealing rings close to the outer piston ends, thereby improving the piston bearing and support in the cylinder, and providing for maximum effectiveness of the piston valving action in two stroke engines.

A further object of the present invention is to

2 provide a novel cylinder block construction in which deflections and distortions due to tightening of the head bolts are not transmitted to the cylinder ends, and in which firm seating and proper sealing action of the head gaskets may be secured with minimum difficulty, and the tendency for the gaskets to blow out is minimized.

Other objects of the invention will appear to those skilled in the art from the detailed description of the preferred embodiments of the invention hereinafter set forth and from the scope of the appended claims.

In general, I accomplish the objects of my invention by forming each individual cylinder of a sleeve supported well inward of its high compression end in a seat formed in the block, with the end outward of the supporting seat free of metal contact with the block and surrounded by cooling water. This permits the use of independent gaskets between the cylinder ends and the head, and the block surface and the head, if desired. In this way, hard gaskets giving maximum protection against blow-out may be used between the cylinders and head subject to high pressure and heat, and softer sealing gaskets may be used between the head and block surfaces which are not subject to the cylinder temperatures and pressures in operation.

In the accompanying drawings wherein I have disclosed two practical embodiments of the invention, and in which similar reference characters designate corresponding parts throughout the several views:

Figure 1 is a vertical sectional view illustrating one embodiment of my new engine cylinder block with a piston cylinder seated therein and the cylinder head being partially shown in assembled position;

Figure 2 is a top plan view of a portion of the cylinder block;

Figure 3 is a detail vertical sectional view taken substantially on the line 3—3 of Figure 1;

Figure 5:
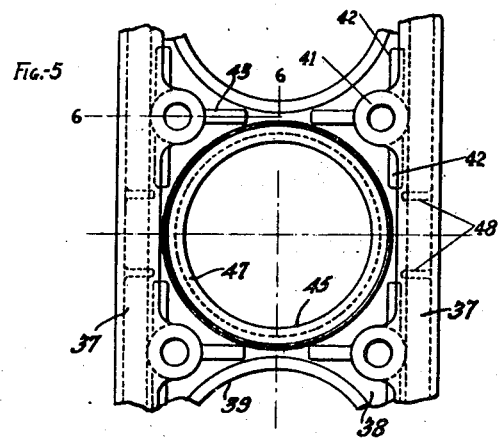
Figure 5 is a top plan view thereof.

With more particular reference to Figures 1, 2 and 3 of the drawings, the opposite side walls 5 and 6 of the engine cylinder block are integrally connected in spaced relation to their upper ends by the horizontal wall 7. This wall, at equidistantly spaced points, is provided with the cylinder receiving openings 8, each of which is formed with an annular seat 9 for the piston cylinder to be presently described.

At their lower ends, the side walls 5 and 6 of the cylinder block are also integrally connected by the horizontal wall 10, which is provided at equidistantly spaced points with openings 11 to receive the lower ends of the piston cylinders, the bearing surface for the cylinder end being extended by the downwardly disposed annular flange 12 formed on the wall 10.

At its upper end each wall 5 and 6 of the cylinder block is formed with an inwardly extending horizontal flange 13, and between the openings 8 inwardly projecting bosses 14 on the walls 5 and 6 integrally connect the flanges 13 with the horizontal wall 7. Each of these bosses has a tapped vertical bore 15. The bosses 14 on opposite side walls of the cylinder block are also integrally connected with each other and the wall 7 by vertical webs 16. The upper end surfaces of the bosses 14 are flush with the upper faces of the flanges 13 to provide seating surfaces 17 for the sealing gasket 18 interposed between the cylinder block and the cylinder head 19.

Each piston cylinder 20 is preferably formed with an upper high compression end portion 21 at the lower end of which an external flange 22 is formed for engagement upon the seat 9. The lower end of the cylinder 20 fits closely within the opening 11 of the wall 10 and flange 12 and is provided in its outer periphery with a number of sealing rings 23. The high compression end 21 of the cylinder has an upper terminal surface 24 which is inwardly spaced from and flush with the seating surfaces 17 of the cylinder block.

The gasket 18 may extend the entire length of the cylinder block and may be provided with openings corresponding in diameter to the inner diameters of the upper end surfaces of the cylinder and suitable openings for the flow of cooling water between the block and head cooling spaces. Preferably, however, gasket 18 is of relatively soft material shaped to fit and seal the outer peripheral surfaces of the head and block, and separate relatively hard annular sealing gaskets 25 are interposed between the cylinder ends and the overlying head surfaces, thus providing effective relatively hard seals for the high compression cylinder ends and a softer outer seal which readily yields to permit firm clamping of the inner sealing rings while effectively maintaining the low pressure outer seal.

The cylinder head 19 is formed with combustion chambers one of which is indicated at 26 opposed to the upper high compression end of the cylinder 20, and which is surrounded by water receiving space 27. The cylinder head is tightly secured or clamped on the upper end of the cylinder block by means of the bolts 28, the gaskets 18 and 25 being interposed between the lower face of the cylinder head and the seating surfaces 18 and 24, respectively, of the cylinder block and the piston cylinder 20. Thus the gaskets will be tightly compressed and the flange 22 on the piston cylinder 20 is held in close contact upon its seat 9. The hard gasket rings 25 which are subject to relatively high pressure and heat will thus afford maximum protection against blow-outs.

The above construction of the engine cylinder block and the assembly of the piston cylinders 20 therein provides a lower water chamber 29 extending vertically between the horizontal walls 7 and 10. This chamber is in communication with the upper water chamber 30 surrounding the high compression end 21 of cylinder 20, through the openings 31 formed in the wall 7 of the cylinder block. It will be noted that this chamber 30 extends to the extreme upper end of each cylinder 20 which is disposed out of metallic contact with any part of the cylinder block.

The base wall of the cylinder head 19 also has openings 32 extending therethrough, which, as indicated by the dotted lines in Figure 2, communicate with the water receiving space or chamber 30 adjacent to the bosses 14, through registering openings formed in the gasket 18.

From the above description, it will be seen that I have provided a novel cylinder block construction and piston cylinder assembly therein which is particularly advantageous in engines of the high compression type since the high compression end of the piston cylinder will be effectively cooled to its extreme upper end by water circulating through the chamber or space 30. Thus excessive heating of this end of the cylinder which tends to cause distortion and destruction of the lubricant for the piston, resulting in leakage, power loss and excessive wear will be obviated. Also the piston rings may be located closely adjacent the upper end of the piston so as to provide proper bearing support for the piston within the cylinder. This is of particular importance in two cycle engines where the piston controls the exhaust and intake of the gases, since improper bearing support for the piston causes errors and leakages in the valving operation which result in loss of power and decreased efficiency.

It will also be noted that since the end portion 21 of the piston cylinder is disposed wholly out of contact with the cylinder block distorting stresses are not transmitted through the block to the cylinder when the cylinder head clamping studs are tightened.

Figure 6:
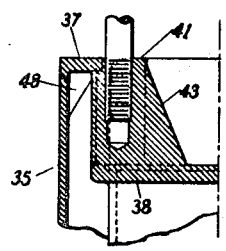
Figure 6 is a detail vertical section taken on the line 6—6 of Figure 5.
Figure 4:
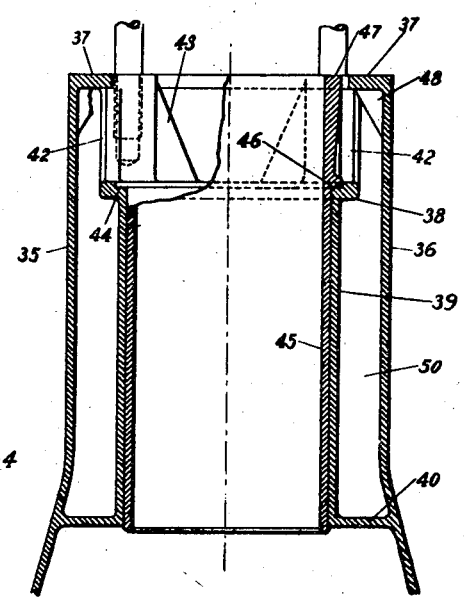
Figure 4 is a vertical section similar to Figure 1, the cylinder head being omitted, illustrating a slightly modified form of the invention.

In Figures 4, 5 and 6 of the drawings I have shown an alternative embodiment of the invention in which the side walls 35 and 36, respectively, of the cylinder block are provided at their upper ends with the comparatively wide inwardly extending horizontal flanges 37. The horizontal wall 38 spaced below the flanges is relatively narrow and has its opposite side edges spaced from the walls 35 and 36 of the cylinder block. The wall 38 is integrally connected by the piston cylinder receiving sleeve 39 with the lower horizontal wall 40 extending longitudinally between the side walls 35 and 36 and integrally connected therewith.

At its opposite sides the wall 38 is also integrally connected with the flanges 37 by the vertical bosses 41 which receive the cylinder head attaching bolts and the webs 42 extending from said bosses longitudinally of each side edge of the wall 38. Short vertically inclined reinforcing webs 43 also extend from the bosses 41 transversely thereof.

In concentric relation with the sleeve 39, the upper face of the wall 38 is formed with the annular seat indicated at 44 upon which the external flange 46 of the piston cylinder 45 is adapted to be engaged. In this case also it will be noted that the upper surface 47 of the high compression end of the cylinder is flush with the upper surfaces of the flanges 37 on the side walls of the cylinder block. Preferably, opposite each of the piston cylinders the flanges 37 are connected with the side walls 35 and 36 of the cylinder block by spaced reinforcing webs 48.

In this embodiment of the invention sealing gaskets substantially of the construction above described are employed and the assembly is completed by the attachment of the cylinder head 10 to the cylinder block as heretofore explained. It will be noted that this construction provides a single continuous water receiving space or chamber 50 extending from the lower horizontal wall 40 of the engine cylinder block to the extreme upper end surface 47 of the cylinder 45. The water in this chamber has direct contact with the high compression end of the cylinder above the wall 38 while the relatively cool lower portion of the piston cylinder is enclosed within the sleeve 39.

From the above description, it will be appreciated that I have provided an engine cylinder block of simple and rugged construction with means for mounting or supporting the piston cylinder therein so that its upper high compression end is out of contact with large metal heat retaining masses, and in which the cooling water circulated through the cylinder block is in immediate contact with all parts of said high compression end of the cylinder. There is thus obtained a rapid transfer of the heat from the high compression end of the piston cylinder to the circulating water in the cylinder block. This eliminates possible distortion of the cylinder due to excessive heating and the several advantages in engine operation above emphasized, resulting in minimum power losses and high operating efficiency.

The embodiment of the invention shown in Figure 1 is most suitable for use in conventional gas engines of the spark ignition type and four cycle Diesel engines while the embodiment shown in Figure 4 is preferred in Diesel two cycle engines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an engine, a cylinder block having a head securing surface; a cylinder supporting seat inward of said surface; a sleeve cylinder supported intermediate its ends in said seat with its high compression end substantially flush with said surface; water cooling space in said block surrounding said sleeve from said seat to said surface, one wall of which is formed by said sleeve; a second supporting seat in said block adjacent the end of said sleeve cylinder away from said surface; packing material between said second seat and said cylinder; a water cooling space in said block between said seats, one wall of which is formed by said cylinder; a head secured to said block and provided with a water cooling space communicating with said first and second mentioned spaces; and sealing gasket material clamped between said head and said surface and said flush sleeve end and said head.

2. In an engine, a cylinder block having outer side walls integrally connected in spaced relation from their upper ends by an internal horizontal wall, said latter wall being provided with a shouldered opening forming a cylinder supporting seat, a piston cylinder having peripheral means engaged upon said seat and a high compression upper end portion above said seat terminating substantially in the plane of the upper end surfaces of said side walls of the cylinder block, said cylinder above and below said horizontal wall being spaced from the cylinder block walls to form upper and lower water circulation spaces and said horizontal wall being provided with additional vertical openings therein directly connecting said lower water circulation space with said upper water circulation space at the cylinder supporting seat in said wall.

3. The combination defined in claim 2, together with cylinder head bolting bosses extending from the upper end of the cylinder block to said horizontal wall and integrally joining the latter with said side walls of the block.

4. In an engine, a cylinder block having an internal horizontal wall spaced below its upper end and provided with a shouldered opening to receive and support a piston cylinder, said wall being constructed and arranged to provide water circulation spaces above and below said wall in direct communication with each other, and a plurality of cylinder head bolting bosses integrally formed at their lower ends with said horizontal wall and extending therefrom to the upper end of the cylinder block.

5. In an engine, a cylinder block having an internal horizontal wall spaced below its upper end and providing a supporting floor having a shouldered opening to receive and support a piston cylinder; a piston cylinder receiving sleeve depending from said internal horizontal wall in concentric relation to said shouldered opening and spaced inwardly from the outer walls of said block and connected thereto at its lower end by a second horizontal wall, said receiving sleeve supporting said floor in spaced relation to the outer walls of said block and providing a continuous water circulation space extending from the upper to the lower end of said block and above and across said floor at the top whereby the high compression upper end portion of a piston cylinder associated with said block will be in direct contact with the circulating water and the relatively cooler lower portion of said cylinder will be surrounded by said floor and said piston cylinder receiving sleeve which respectively have their outer edges and outer wall in direct contact with the circulating water.

EDWARD A. WINFIELD.

REFERENCES CITED

The following references are of record in the file of this patent:

UNITED STATES PATENTS

| Number | Name | Date |
| --- | --- | --- |
| 964,542 | Odee | July 19, 1910 |
| 1,194,722 | Davol | Aug. 15, 1916 |
| 1,525,267 | Brock | Feb. 3, 1925 |
| 1,643,645 | Strand | Sept. 27, 1927 |
| 2,120,004 | Schwaiger | June 7, 1938 |
| 2,290,212 | Schweitzer | July 21, 1942 |

FOREIGN PATENTS

| Number | Country | Date |
| --- | --- | --- |
| 128,139 | Austria | 1932 |
| 406,000 | England | 1934 |